(12) United States Patent
Santoro

(10) Patent No.: US 8,047,673 B2
(45) Date of Patent: Nov. 1, 2011

(54) LIGHT CONTROL DEVICE EXHIBITING BATWING LUMINOUS INTENSITY DISTRIBUTIONS IN UPPER AND LOWER HEMISPHERES

(75) Inventor: Scott Santoro, Delta (CA)

(73) Assignee: Philips Electronics Ltd, Ontario (CA)

( * ) Notice: Subject to any disclaimer, the term of this patent is extended or adjusted under 35 U.S.C. 154(b) by 190 days.

(21) Appl. No.: 12/100,337

(22) Filed: Apr. 9, 2008

(65) Prior Publication Data

US 2008/0285267 A1 Nov. 20, 2008

Related U.S. Application Data

(60) Provisional application No. 60/911,049, filed on Apr. 10, 2007.

(51) Int. Cl.
*F21V 21/00* (2006.01)

(52) U.S. Cl. ............... 362/217.01; 362/217.02

(58) Field of Classification Search .......... 362/147, 362/148, 217.01, 222, 223, 224, 25, 217.02, 362/217.03, 217.04, 217.08, 217.09, 290, 362/291, 310, 325, 326, 339, 340, 342, 351, 362/355, 360, 361
See application file for complete search history.

(56) References Cited

U.S. PATENT DOCUMENTS

| | | | |
|---|---|---|---|
| 0,190,596 A | 5/1877 | Johnson | |
| 1,235,297 A | 7/1917 | Dillon | |
| 1,941,079 A | 12/1933 | Exelmans | |
| 2,136,862 A | 10/1937 | Norton | |
| 2,138,373 A * | 11/1938 | Doane | 362/283 |
| 2,368,014 A | 1/1945 | Franck | |
| 2,402,176 A * | 6/1946 | Marks | 362/19 |
| 2,740,216 A | 4/1956 | Liberman | |
| 2,744,190 A | 5/1956 | Kilemnik | |
| D190,596 S | 6/1961 | Franck | |
| 3,154,254 A | 10/1964 | McPhail, et al. | |
| 3,619,021 A | 11/1971 | Biedermann | |
| 3,647,148 A | 3/1972 | Wince | |
| 3,681,591 A | 8/1972 | Lock | |
| 3,698,810 A | 10/1972 | Bestenreiner et al. | |
| 3,708,217 A | 1/1973 | McMahon | |
| 3,735,124 A | 5/1973 | Stahlhut | |
| 3,829,680 A | 8/1974 | Jones | |
| 4,059,755 A | 11/1977 | Brabson | |
| 4,161,015 A | 7/1979 | Dey et al. | |
| 4,186,433 A | 1/1980 | Baldwin | |

(Continued)

FOREIGN PATENT DOCUMENTS

DE    4224006 A1    2/1994

(Continued)

OTHER PUBLICATIONS

Akito Iwamoto, "Artificial diffuser for Fourier transform hologram recording," Applied Optics, vol. 19, No. 2, pp. 215-221 (Jan. 1980).

(Continued)

*Primary Examiner* — Hargobind S Sawhney

(57) ABSTRACT

A light control device implemented as a luminaire exhibits an ultra-wide batwing luminous intensity distribution in an upper hemisphere that provides substantially uniform illumination of a ceiling surface, even when the luminaire is mounted very close to the ceiling. Luminous side panel diffusers facilitate blending the luminaire with the ceiling surface as they create a batwing luminous intensity distribution in a lower hemisphere to evenly illuminate a work plane.

16 Claims, 13 Drawing Sheets

U.S. PATENT DOCUMENTS

| | | | |
|---|---|---|---|
| 4,262,326 A | 4/1981 | Lewin | |
| 4,336,978 A | 6/1982 | Suzuki | |
| 4,410,932 A * | 10/1983 | Oster | 362/294 |
| 4,427,265 A | 1/1984 | Suzuki et al. | |
| 4,602,843 A | 7/1986 | Glaser-Inbari | |
| 4,610,499 A | 9/1986 | Chern et al. | |
| 4,704,666 A | 11/1987 | Davis | |
| 4,713,738 A | 12/1987 | Davis | |
| 4,960,314 A | 10/1990 | Smith et al. | |
| 4,974,137 A | 11/1990 | Evans, Jr. et al. | |
| 5,009,484 A | 4/1991 | Gerritsen | |
| 5,048,925 A | 9/1991 | Gerritsen et al. | |
| 5,105,345 A | 4/1992 | Katoh et al. | |
| 5,303,322 A | 4/1994 | Winston et al. | |
| 5,365,354 A | 11/1994 | Jannson et al. | |
| 5,471,327 A | 11/1995 | Tedesco et al. | |
| 5,473,516 A | 12/1995 | Van Order et al. | |
| 5,534,386 A | 7/1996 | Petersen et al. | |
| 5,582,474 A | 12/1996 | Van Order et al. | |
| 5,609,939 A | 3/1997 | Petersen et al. | |
| 5,631,754 A | 5/1997 | Jannson et al. | |
| 5,696,630 A | 12/1997 | Hayashi | |
| 5,701,015 A | 12/1997 | Lungershausen et al. | |
| 5,808,759 A | 9/1998 | Okamori et al. | |
| 5,816,681 A | 10/1998 | Tedesco | |
| 5,861,990 A | 1/1999 | Tedesco | |
| 5,865,528 A * | 2/1999 | Compton et al. | 362/300 |
| 5,880,861 A | 3/1999 | Nishida | |
| 5,956,106 A | 9/1999 | Petersen et al. | |
| 5,999,281 A | 12/1999 | Abbott et al. | |
| 6,048,081 A | 4/2000 | Richardson | |
| 6,158,245 A | 12/2000 | Savant | |
| 6,159,398 A | 12/2000 | Savant et al. | |
| 6,161,939 A * | 12/2000 | Bansbach | 362/223 |
| 6,166,389 A | 12/2000 | Shie et al. | |
| 6,247,828 B1 * | 6/2001 | Herst | 362/354 |
| 6,275,219 B1 | 8/2001 | Isenman | |
| 6,424,395 B1 | 7/2002 | Sato et al. | |
| 6,505,953 B1 * | 1/2003 | Dahlen | 362/224 |
| 6,649,921 B1 | 11/2003 | Cekic et al. | |
| 6,714,185 B2 | 3/2004 | Kim et al. | |
| 6,837,592 B1 * | 1/2005 | Dahlen | 362/224 |
| 6,924,943 B2 | 8/2005 | Minano et al. | |
| 7,002,747 B2 | 2/2006 | Augustyn et al. | |
| 7,006,306 B2 | 2/2006 | Falicoff et al. | |
| 7,021,797 B2 | 4/2006 | Minano et al. | |
| 7,052,157 B1 * | 5/2006 | Lau | 362/216 |
| 7,057,813 B2 | 6/2006 | Umeya et al. | |
| 7,152,985 B2 | 12/2006 | Benitez et al. | |
| 7,181,378 B2 | 2/2007 | Benitez et al. | |
| 7,184,614 B2 | 2/2007 | Slatkine | |
| 7,255,458 B2 | 8/2007 | Ashdown | |
| 7,377,671 B2 | 5/2008 | Minano et al. | |
| 7,460,985 B2 | 12/2008 | Benitez et al. | |
| 7,660,039 B2 | 2/2010 | Santoro et al. | |
| 7,661,840 B1 | 2/2010 | Eriksson | |
| 7,663,315 B1 | 2/2010 | Hulse | |
| 7,672,051 B2 | 3/2010 | Hoshino et al. | |
| 7,686,478 B1 | 3/2010 | Hulse et al. | |
| 7,740,600 B2 | 6/2010 | Slatkine et al. | |
| 7,740,651 B2 | 6/2010 | Barak et al. | |
| 7,753,561 B2 | 7/2010 | Chaves et al. | |
| 7,762,965 B2 | 7/2010 | Slatkine | |
| 7,771,374 B2 | 8/2010 | Slatkine | |
| 7,798,675 B2 | 9/2010 | Chaves et al. | |
| 7,806,547 B2 | 10/2010 | Benitez et al. | |
| 7,837,361 B2 | 11/2010 | Santoro et al. | |
| 2006/0221606 A1 * | 10/2006 | Dowling | 362/217 |
| 2007/0211457 A1 * | 9/2007 | Mayfield et al. | 362/223 |
| 2007/0268585 A1 | 11/2007 | Santoro et al. | |
| 2010/0002426 A1 * | 1/2010 | Wu et al. | 362/223 |

FOREIGN PATENT DOCUMENTS

| | | |
|---|---|---|
| EP | 1517587 A1 | 3/2005 |
| EP | 1517587 B1 | 11/2007 |
| JP | 59-131902 | 7/1984 |
| JP | 04132101 | 5/1992 |
| JP | 4132101 | 5/1992 |
| JP | 10319873 | 12/1998 |
| JP | 2000039515 | 2/2000 |
| JP | 200039515 | 8/2000 |
| WO | 9630697 | 10/1996 |
| WO | 9714982 | 4/1997 |
| WO | 99/06873 | 2/1999 |
| WO | 00/10797 | 3/2000 |
| WO | 00/10929 | 3/2000 |
| WO | 00/11522 | 3/2000 |
| WO | 2004051223 A2 | 6/2004 |
| WO | 2005008127 A1 | 1/2005 |
| WO | 2008037049 A1 | 4/2008 |

OTHER PUBLICATIONS

B.S. Thornton, "Limit of the moth's eye principle and other impedance-matching corrugations for solar-absorber design," J. Opt. Soc. Am., vol. 65, No. 3, pp. 267-270 (Mar. 1975).

Bartolini, R. 1977. "Photoresists," Holographic Recording Materials, H. M. Smith, Ed. Berlin, Germany: Springer-Verlag.

Bartolini, R.A. 1974. "Characteristics of Relief Phase Holograms Recorded in Photoresists," Applied Optics 18(1):129-139.

Brauer, R., F. Wyrowski, and O. Bryngdahl. 1991. "Diffusers in Digital Holography," J. Optical Society of America 8(3):572-578 (Mar.).

Brian H. Cumpston, Sundaravel P. Ananthavel, Stephen Barlow, et al. "Two-photon polymerization initiators for three-dimensional optical data storage and microfabrication," Nature, vol. 398, pp. 51-54 (Mar. 1999).

C. N. Kurtz, "Transmittance Characteristics of Surface Diffusers and the Design of Nearly Band-Limited Binary Diffusers," J. Opt. Soc. Am, vol. 62, No. 8, pp. 982-989 (Aug. 1972).

C. N. Kurtz, H. O. Hoadley, and J. J. DePalma, "Design and synthesis of random phase diffusers," J. Opt. Soc. Am., vol. 63, No. 9, pp. 1080-1092 (Sep. 1973).

Caufield, H.J. 1971. "Kinoform Diffusers," Developments in Holography, SPIE vol. 25, pp. 111-113.

Dallas, W. J. 1973. "Deterministic Diffusers for Holography," Applied Optics 12(6):1179-1187 (Jun.).

Dengler, J. J., and V. Wittwer. 1994. "Glazings with Granular Aerogel," Optical Materials Technology for Energy Efficiency and Solar Energy Conversion XIII, SPIE vol. 2255, pp. 718-727.

Denisyuk, Y. N., V. V. Orlov, and J. B. Brui. 1998. "One-Dimensional Diffuse Screen for 3-D Image Projection," Practical Holography XII, SPIE vol. 3293, pp. 78-82.

European Patent Office; Examination Report; Oct. 14, 2009, pp. 0-9; Germany. cited by other.

*Finelite, Inc; Finelite, Inc. v. Ledalite Architectural Products*; Mar. 25, 2010; United States District Court—Northern District of California; pp. 1-32; U.S.

Gerritsen, H. J. 1993. "Diffractive Daylighting: Ways to Obtain Wide Angular Range, Large Efficiency, Near Achromatic Operation," Optical Materials Technology for Energy Efficiency and Solar Energy Conversion XII, SPIE vol. 2017, pp. 377-388.

Gray, P. F. 1978. "A Method for Forming Optical Diffusers of Simple Known Statistical Properties," Optica Acta 25(8):765-775.

Hoang Yan Lin, Wann-Diiang Tyan, and Ying-Tsung Lu, High- gain, wide-viewing-angle and null-hot-spot optical diffuser useful for display screen application, SPIE, vol. 2892, pp. 64-71, Sep. 1996.

J.C. Dainty, "The Statistics of Speckle Patterns," Progress in Optics, E. Wolf, ed., vol. VIX, pp. 1-46 (1976).

Lesem, B, and P. M. Hirsch, and J. A. Jordan , Jr. 1969. "The Kinoform: A New Wavefront Reconstruction Device," IBM J. Research and Development 13:150-155.

Lesem, B, and P. M. Hirsch. 1968. "Computer Synthesis of Holograms for 3-D Display," Communications of the ACM 11(10:661-674).

Leskova, T. A., A. A. Maradudin, E. R. Mendez, and I Simonsen, 2000. "Band-Limited Uniform Diffuser in Transmission," Scattering and Surface Roughness III, SPIE vol. 4100, pp. 113-123.

Ling, D., L. Naiguang, X. Ping, Y. Shi, and Y. Li. 1996. "Holographic Diffuser to Definite Direction," vol. 2866, International Conference on Holography and Optical Information Processing (ICHOIP '96), pp. 398-400.

Maradudin, A. A., and I. Simonsen. 1999. "Random Surfaces that Suppress Single Scattering," Optical Letters 24(18):1257-1259.

1259. Marek Kowalczyk, "Spectral and imaging properties and diffusers," J. Opt. Soc. Am., vol. 1, No. 2, pp. 192-200 (Feb. 1984).

Mendoza, E. A., D. Mintzer, P. Low, and A. Menon. 1997. "A Novel Material Used for Light Shaping Diffusers," SPIE vol. 3136, pp. 114-117.

S. J. Wilson and M. C. Hutley, "The optical properties of 'moth eye' antireflection surfaces," Optical Acta, vol. 29, No. 7, pp. 993-1009 (1982).

Sincerbox, G. T. 1986. "Light Diffuser with Controlled Divergence," IBM Technical Disclosure Bulletin 29(1):276-279 (June).

Tholl, H. D., R. Kubiza, and C. G. Stojanoff. 1994. "Stacked volume Holograms as Light Directing Elements," Optical Materials Technology for Energy Efficiency and Solar Energy Conversion XIII, SPIE vol. 2255, pp. 486-498.

Umstatter, H. L. and J. D. Trolinger. 1986. "Development of a High-Grain, Holographic Grating Projection Screen," Ultraprecision Machining and Automated Fabrication of Optics, SPIE vol. 676, pp. 17-23.

Wadle, S., D. Wuest, J. Cantalupo, and R. S. Lakes. 1994. "Holographic Diffusers," Optical Engineering 33(1):213-218.

Yoshikazu Makayama and Makoto Kato, "Diffuser with pseudorandom phase sequence," J. Opt. Soc. Am., vol. 69, No. 10, pp. 1367-1372 (Oct. 1979).

"Three Dimensional Microfabrication with Two-Photon-Absorbed Photopolymerization" S. Maruo et al, Optics Letters 22(2) pp. 132-134 (Jan. 15, 1997).

"Complex Micromachines Produced and Driven by Light" P. Galajda et al, Applied Physics Letters 78(2) pp. 249-251 (Jan. 8, 2001).

* cited by examiner

20 μm

10 μm

LIGHT CONTROL DEVICE EXHIBITING BATWING LUMINOUS INTENSITY DISTRIBUTIONS IN UPPER AND LOWER HEMISPHERES

RELATED APPLICATION

This application claims benefit of U.S. Provisional Patent Application No. 60/911,049, filed Apr. 10, 2007.

COPYRIGHT NOTICE

© 2008 Ledalite Architectural Products, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

SUMMARY OF THE DISCLOSURE

A light control device implemented as a luminaire exhibits an ultra-wide batwing luminous intensity distribution in an upper hemisphere that provides substantially uniform illumination of a ceiling surface, even when the luminaire is mounted very close to the ceiling. Luminous side panel diffusers facilitate blending the luminaire with the ceiling surface as they create a batwing luminous intensity distribution in a lower hemisphere to evenly illuminate a work plane.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
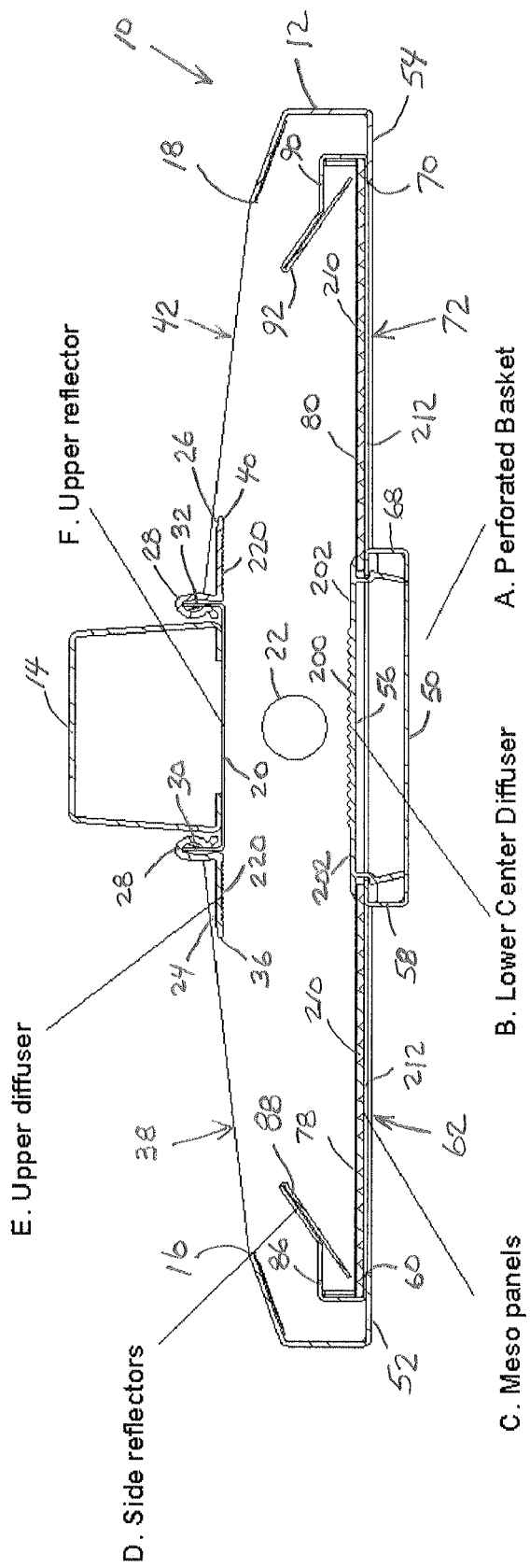
FIG. 1 is a cross-sectional view of a preferred embodiment of a luminaire that exhibits an ultra-wide batwing luminous intensity distribution in an upper hemisphere and a batwing luminous intensity distribution evenly illuminating a work plane in a lower hemisphere.
Figure 2A:
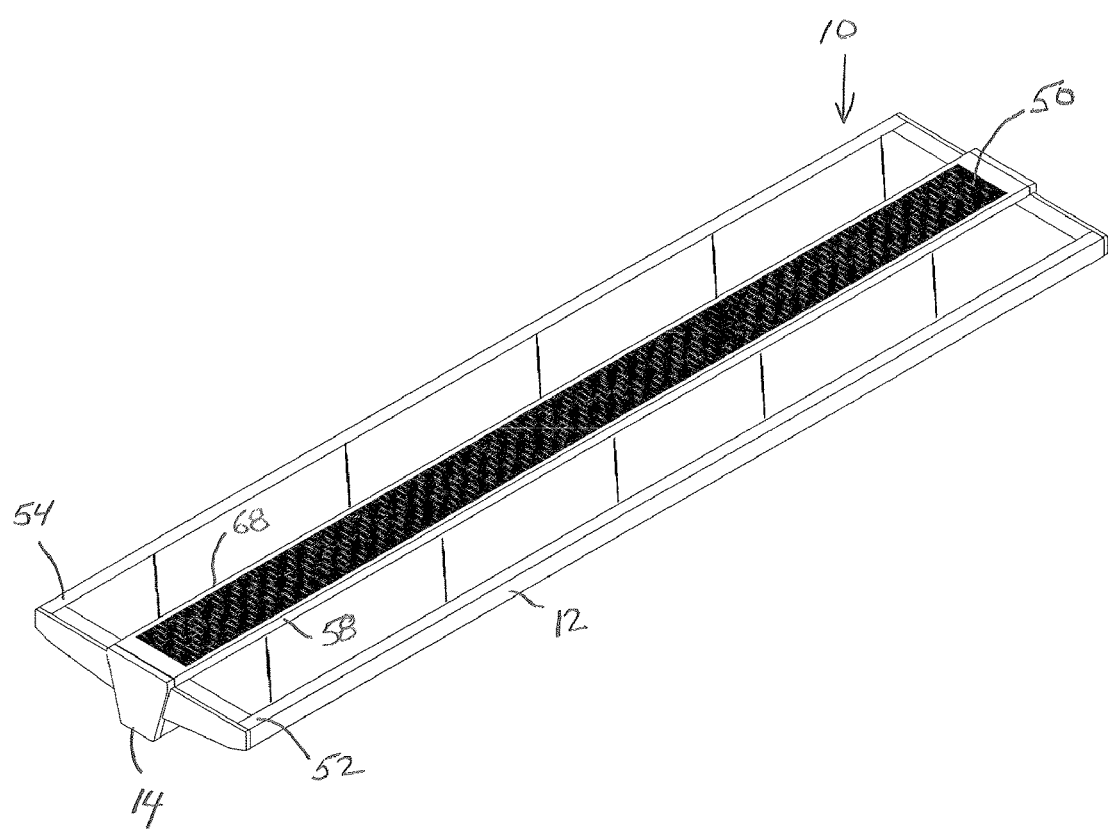
FIGS. 2A and 2B are respective bottom and top isometric views of the light control device of FIG. 1.
Figure 2B:
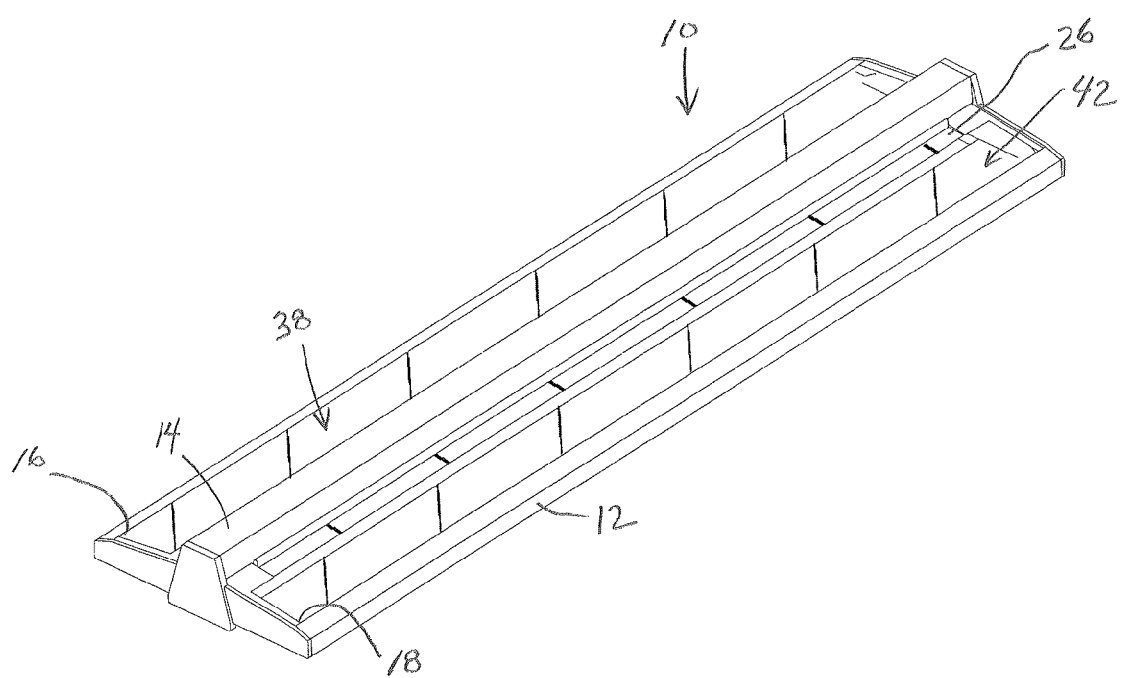

FIG. 1 is a cross-sectional view and FIGS. 2A and 2B are respective bottom and top isometric views of a light control device or luminaire 10. Luminaire 10 includes a generally rectangular housing 12 that has, extending along its length and upper surface, a central ballast channel 14 and opposite upper side margins 16 and 18. Ballast channel 14 is closed in the interior of housing 12 by an upper reflector 20. A tubular light source 22, preferably a fluorescent lamp, installed in a socket saddle (not shown) is positioned within housing 12 and extends in generally central alignment along the length of ballast channel 14.

A multiple-section upper diffuser in the form of a left-hand side upper diffuser 24 and a right-hand side upper diffuser 26 attached by clips 28 to respective flanges 30 and 32 of upper reflector 20 extends laterally of ballast channel 14 and along its length. Ballast channel 14, together with upper side diffusers 24 and 26, divides the upper surface of housing 12 into first and second separate upper regions. A distal side margin 36 of upper side diffuser 24 and upper side margin 16 define a rectangular opening 38 in the first upper region, and a distal side margin 40 of upper side diffuser 26 and upper side margin 18 define a rectangular opening 42 in the second upper region. Rectangular openings 38 and 42 are spaced apart and positioned to allow uninterrupted propagation of light emitted by light source 22 for incidence on a ceiling surface 44 (FIG. 4B).

Housing 12, has extending along its length and lower surface, a perforated center basket 50 and opposite lower side support members 52 and 54. Perforated center basket 50 is closed in the interior of housing 12 by a lower center diffuser 56. Perforated center basket 50 divides the lower surface of housing 12 into first and second separate lower regions. A side 58 of perforated center basket 50 and a side margin 60 of support member 52 define a rectangular opening 62 in the first lower region, and a side 68 of perforated center basket 50 and a side margin 70 of support member 54 define a rectangular opening 72 in the second lower region. A left-hand side diffuser panel 78 and a right-hand side diffuser panel 80 cover rectangular openings 62 and 72, respectively. An outer rail 86 mounted on the inner surface of support member 52 carries an inwardly inclined side reflector 88, and an outer rail 90 mounted on the inner surface of support member 54 carries an inwardly inclined side reflector 92.

Figure 3:
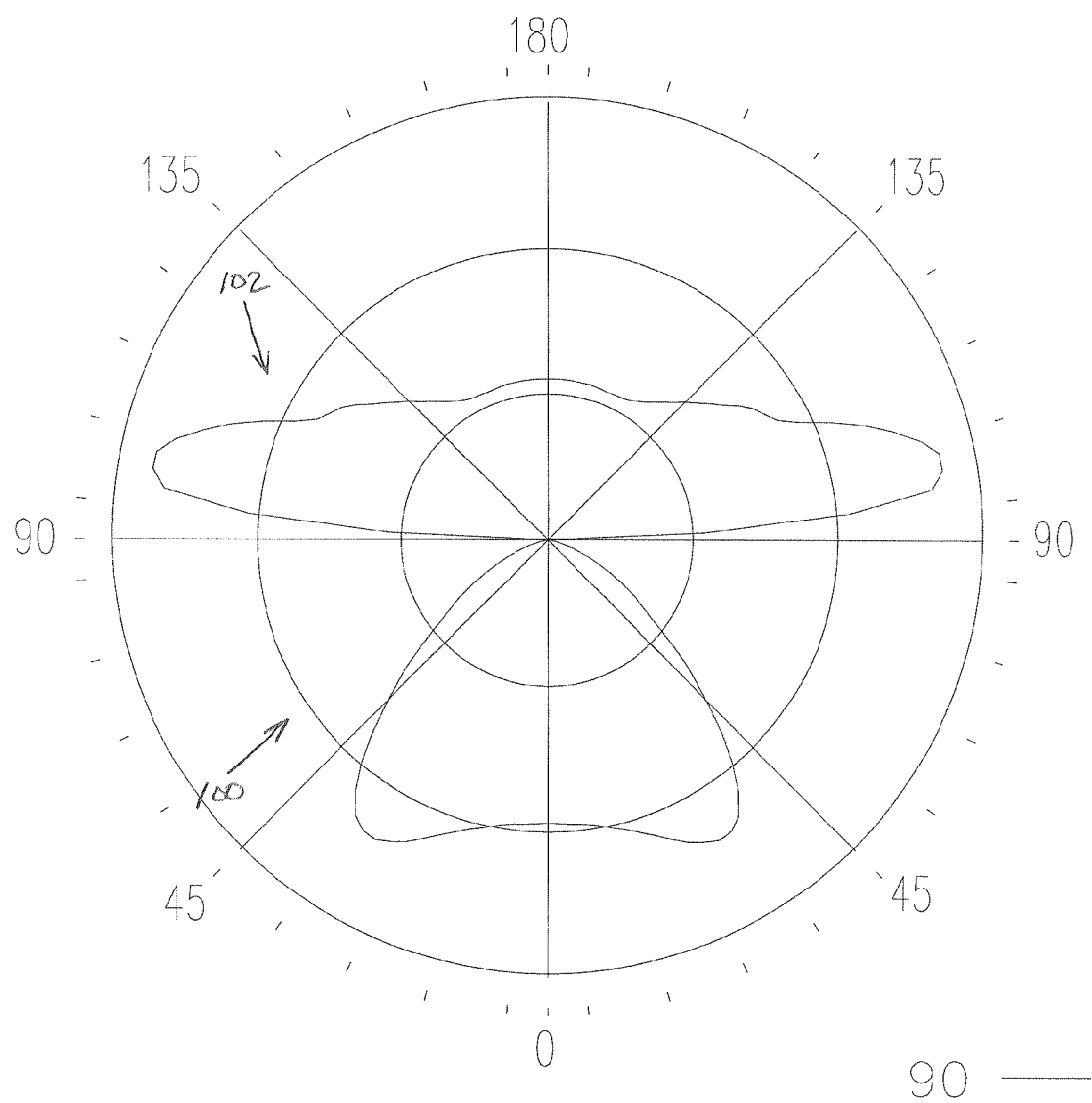
FIG. 3 is a photometric graph showing batwing luminous intensity distribution patterns in a lower hemisphere and an upper hemisphere for a 90 degree azimuthal angle.

Luminaire 10 exhibits with a downlight and an uplight batwing luminous intensity distribution patterns in lower and upper hemispheres. FIG. 3 is a photometric graph showing batwing luminous intensity distribution patterns in a lower hemisphere 100 and an upper hemisphere 102 for a 90 degree azimuthal angle. FIGS. 4A, 4B, 4C, 4D, and 4E are cross-sectional views of luminaire 10 showing the contributions by the various optical components of light intensity distributions that form the downlight and uplight batwing luminous intensity distribution patterns of FIG. 3.

The downlight uses diffuser panels 78 and 80 to create a luminous optic with a batwing intensity distribution in lower hemisphere 100. The batwing distribution is created by perforated center basket 50 and lower center diffuser 56 positioned between side diffuser panels 78 and 80. Perforated center basket 50 combined with lower center diffuser 56 allows a limited amount of light propagating from lamp 22 and from reflector 20 below ballast channel 14 to exit luminaire 10 in a lambertian luminous intensity distribution. Side diffuser panels 78 and 80 receive light emitted by lamp 22 and reflected by upper reflector 20 leaving at high angles and bend the light down toward a work plane 104. This simultaneously reduces glare at high angles and creates a batwing distribution in lower hemisphere 100, as shown in FIG. 4A to evenly illuminate work plane 104 below.

Figure 4A:
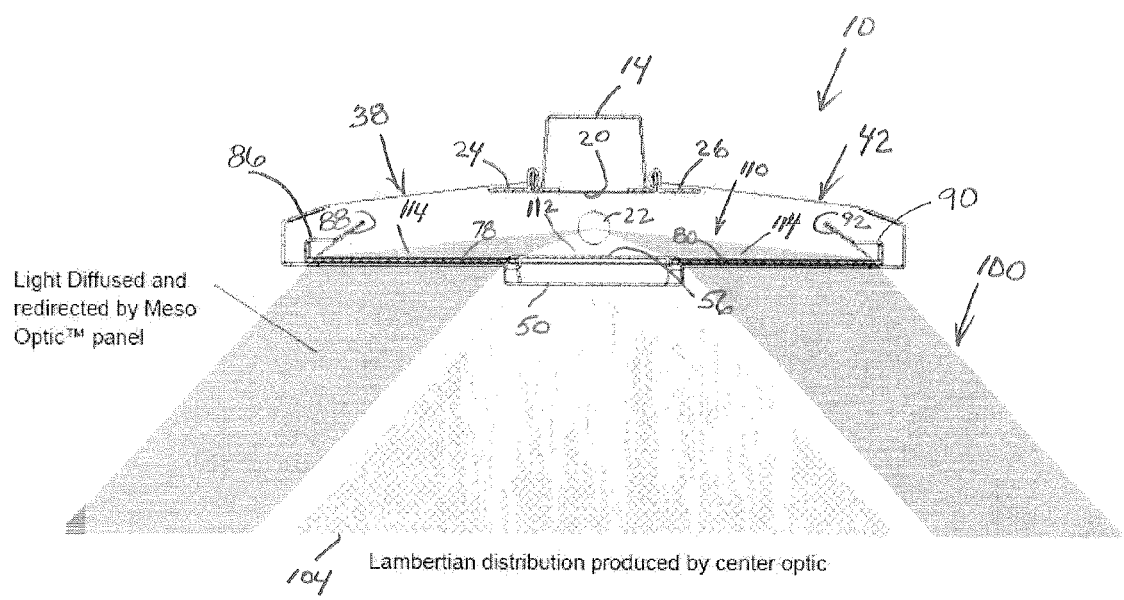
FIGS. 4A, 4B, 4C, 4D, and 4E are cross-sectional views of the luminaire of FIGS. 1, 2A, and 2B showing the contributions by the various optical components of light intensity distributions that form the downlight and uplight batwing luminous intensity distribution patterns of FIG. 3.
Figure 4B:
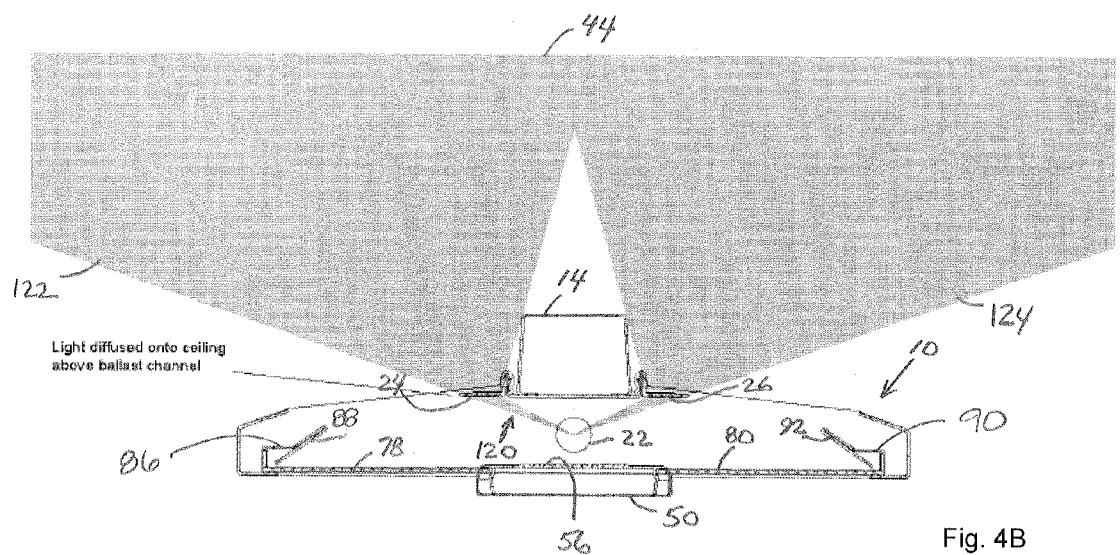

FIG. 4A shows the light rays propagating into lower hemisphere 100 organized in a first light ray set 110 that includes a first subset 112 of light rays incident on perforated center basket 50 and a second subset 114 of light rays incident on side diffuser panels 78 and 80. The light rays produced in a lambertian intensity distribution by perforated center basket 50 propagate as a divergent fan of light rays and are illustrated by a cross-hatched region, and the light rays diffused and redirected by side diffuser panels 78 and 80 are illustrated by shaded regions. Side reflectors 88 and 92 located on the respective outer rails 86 and 90 allow side diffuser panels 78 and 80 to be luminous when an observer views them from opposite sides of luminaire 10.

The luminous intensity distribution in upper hemisphere 102 is created by a combination of optics that work with the lower optics to create an ultra-wide batwing distribution in upper hemisphere 102 to evenly illuminate ceiling surface 44. The upper hemisphere illumination optics evenly illuminate the area above ballast channel 14 where no direct light from lamp 22 falls. This is accomplished by upper side diffusers 24 and 26, which are two pieces of linear prismatic material that flank ballast channel 14. This material receives incident light and diffuses it up onto ceiling surface 44 above ballast channel 14, as shown in FIG. 4B. FIG. 4B shows the light rays propagating into upper hemisphere 102 organized in a second light ray set 120 that propagates as two partly overlapping fans 122 and 124 of light rays upwardly toward ceiling surface 44. Upper side diffusers 24 and 26 also aid in smoothing the transition as the projected image from lamp 22 and lower center diffuser 56 progressively increases as the vertical angle decreases.

Figure 4C:
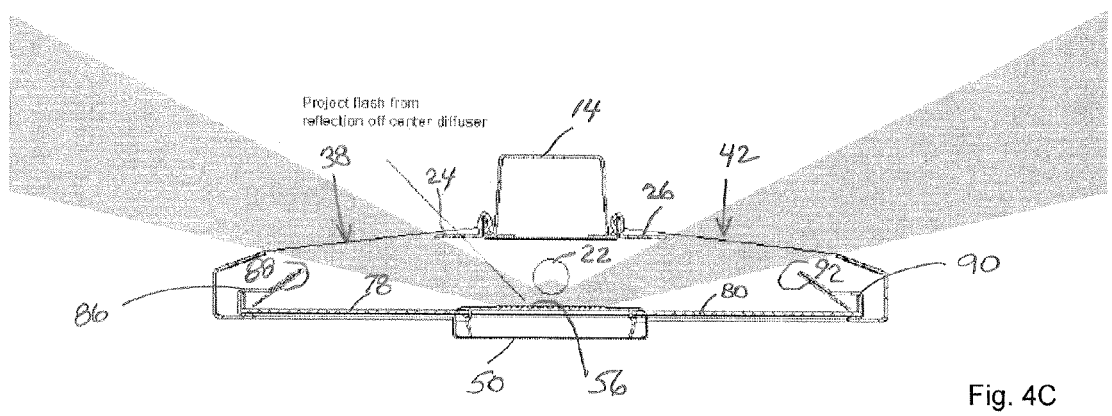
Figure 4D:
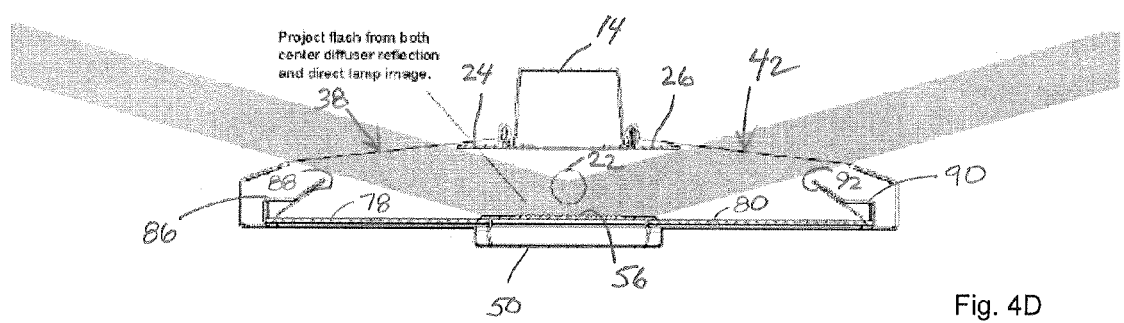
Figure 4E:
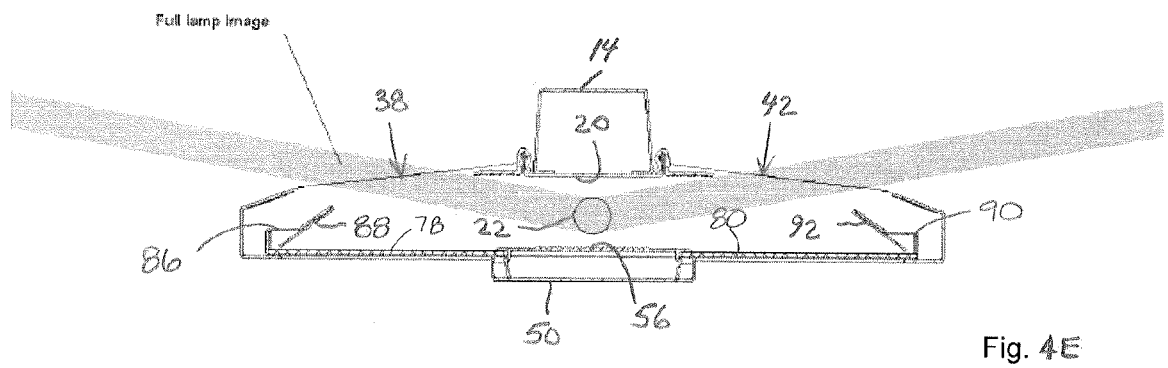

A goal of the optic is to create an ultra-wide batwing distribution. Ballast channel 14 blocks light leaving upwardly from luminaire 10 so that the light does not reach a region above ballast channel 14. Upper side diffusers 24 and 26 fill in this region with far less light than would be provided by direct illumination from lamp 22. As the vertical angle decreases, part of the distribution is created as the linear prismatic structure of lower center diffuser 56 reflects light away from lamp 22 at high angles and through rectangular openings 38 and 42, as shown in FIG. 4C. This provides transitional light before direct light from lamp 22 starts to be projected onto ceiling surface 44. This reflected light works with upper side diffusers 24 and 26 to eliminate striations on ceiling surface 44 during this transition. As the vertical angle decreases even further, a projected partial lamp image progressively increases, combining with light reflected off lower center diffuser 56, as shown in FIG. 4D. This smoothly transitions the distribution to its peak, thereby allowing for even ceiling illumination. When the vertical angle reaches 100 degrees, a full image of lamp 22 is projected as shown in FIG. 4E, which creates the peak output of the distribution. Side reflectors 88 and 92 help illuminate side diffuser panels 78 and 80 from opposite directions so that, when luminaire 10 is viewed from the side, the panel diffusers closer and farther appear to have similar brightness.

The downlight and uplight optical performance characteristics described above are achieved with preferred optical components made and functioning as specified below.

Perforated center basket 50 is made of perforated steel and diffuses incident light in a lambertian luminous intensity distribution pattern into lower hemisphere 100, as shown in FIG. 4A. Perforated center basket 50 creates an evenly luminous basket.

Lower center diffuser 56, which is made of extruded prismatic acrylic material with opal additive, partly transmits incident light. The amount of opal additive is chosen to achieve the desired balance of transmission, scattering, and reflection of incident light. With reference to FIG. 1, lower center diffuser 56 has a light diffusing surface with a textured center portion 200 between flat side portions 202. Flat side portions 202 impart a specular reflection to incident light as compared with textured center portion 200, which scatters the light incident to it. The lower hemisphere optical effect entails diffusion of the partly transmitted light into perforated center basket 50, which produces the lambertian intensity distribution pattern shown in FIG. 4A. The upper hemisphere optical effect entails reflection at high angles of light emitted by lamp 22, as shown in FIG. 4C. This reflected light provides transitional light before direct light from lamp 22 starts to be projected onto ceiling surface 44 and cooperates with upper side diffusers 24 and 26 to eliminate striations on ceiling surface 44 during this transition. As the vertical angle decreases even further, a projected partial lamp image progressively increases and combines with light reflected off lower center diffuser 56, as shown in FIG. 4D. This smoothly transitions the distribution to its peak, thereby allowing for even ceiling illumination.

Diffuser panels 78 and 80 each include a MesoOptic™ film material 210 supported on an acrylic substrate 212. Film material 210 faces the incident light and may be of circular, elliptical, or linear MesoOptic™ type characterized by widespread diffusion. The MesoOptic™ surface relief structure contacts the surface of substrate 212. MesoOptic™ film material is described with reference to kinoform diffuser material in U.S. Patent Application Pub. No. 2007-0268585, Nov. 22, 2007, for Light Control Devices Implemented With Diffusers Having Controllable Diffusion Characteristics ('555 publication). The following description and associated drawing figures are taken in pertinent part from the '585 publication and set forth the production techniques used in the formation of preferred embodiments of side diffuser panels 78 and 80.

A kinoform diffuser made in accordance with this disclosure is composed of a complex surface relief pattern that produces controllable diffusion characteristics with off-axis transmittance and reflectance properties, elimination of zero-order beam, and freedom from spectral dispersion under achromatic illumination.

Fabrication of the kinoform diffuser is carried out by moving a photosensitive plate coated with photoresist film between successive ones of multiple exposures of the photoresist film to a far-field speckle pattern. The laser speckle pattern remains unchanged, and so the recorded patterns are spatially autocorrelated.

Figure 5:
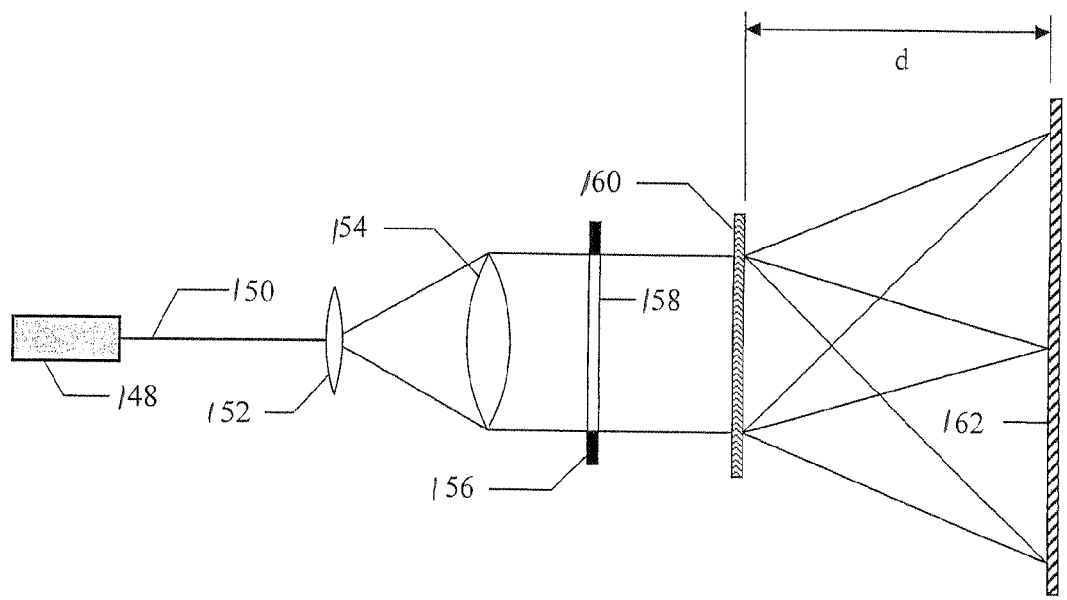
FIG. 5 shows a prior art single-beam holographic setup for the recording of kinoform diffusers.

FIG. 5 shows a basic prior art single-beam optical setup used to record kinoform diffusers. (Skilled persons will appreciate that many variations in the optical setup are possible.) A laser 148 produces a beam of coherent light 150 that is expanded by lenses 152 and 154 to illuminate a diffuser 160 with a coherent planar wavefront propagating through an opaque mask 156 having an aperture 158. A photosensitive recording plate 162 is located a distance, d, behind diffuser 160. (Suitable photosensitive materials include positive and negative photoresist emulsions, silver halide films, dichromated gelatin, and various photopolymers.)

The light scattered by diffuser 160 produces on a surface of photosensitive recording plate 162 a random laser speckle pattern that is recorded photographically. Photosensitive plate 162 is developed in accordance with known processing techniques to produce a transparent substrate with a surface relief pattern whose spatially distributed height distribution is proportional to the spatially distributed intensity of the recorded laser speckle pattern. This is the transmissive kinoform diffuser. A reflective kinoform diffuser can be fabricated by, for example, applying an evaporated metal film to the surface of the transmissive diffuser. Alternatively, the surface relief pattern can be transferred using known replication techniques such as embossing or molding to an opaque metallic or plastic substrate.

When the transmissive kinoform diffuser is illuminated by a coherent planar wavefront, the length of the optical path through the diffuser at any point is determined by the height of the surface relief pattern at that point. Because the phase retardation of the wavefront propagating through the diffuser is dependent on the optical path length, the planar wavefront is randomly scattered according to the surface relief pattern of the kinoform diffuser. In theory, the kinoform diffuser reconstructs the laser speckle pattern generated by ground glass diffuser 160.

The same principle applies to reflective kinoform diffusers, except that the differences in optical path length and subsequent phase retardation occur in free air or other optically transparent medium immediately above the diffuser surface.

The incoherent summation of autocorrelated speckle patterns producing the resultant kinoform diffuser beam distribution is not necessarily characterized by a substantially Gaussian function. Various combinations of the number of exposures and movement of the photosensitive plate between the exposures contribute to the production of kinoform diffusers with uniform and annular beam distributions as shown in FIGS. 6A, 6B, 6C, and 6D. Unlike Gaussian distributions, these beam distributions exhibit greatly reduced scattering outside of the specified range of angles. Movement of the photosensitive plate between exposures also enables the fabrication of kinoform diffusers that exhibit elimination of zero-order beam and freedom from spectral dispersion under achromatic illumination.

Figure 6A:
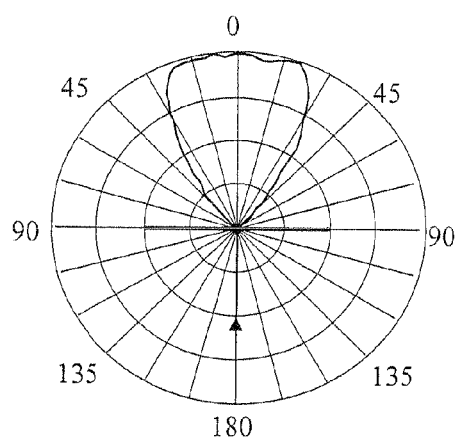
FIGS. 6A, 6B, 6C, and 6D show the beam distributions for four classes of kinoform diffusers, the surface relief patterns of which are facing the incident beam.
Figure 6B:
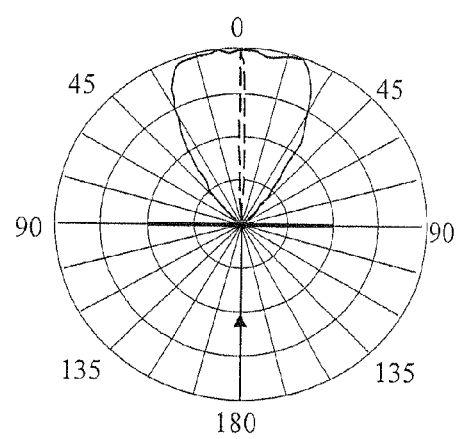
Figure 7:
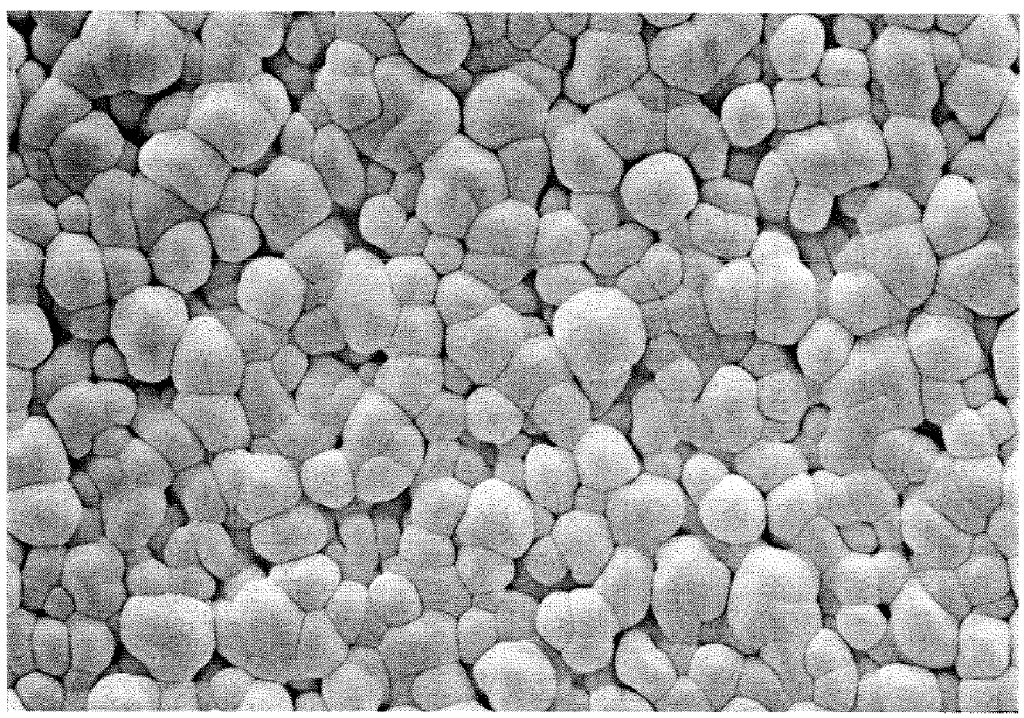
FIG. 7 shows a photomicrograph of a circular distribution kinoform diffuser constructed in accordance with the invention to exhibit a uniform beam distribution.
Figure 8:
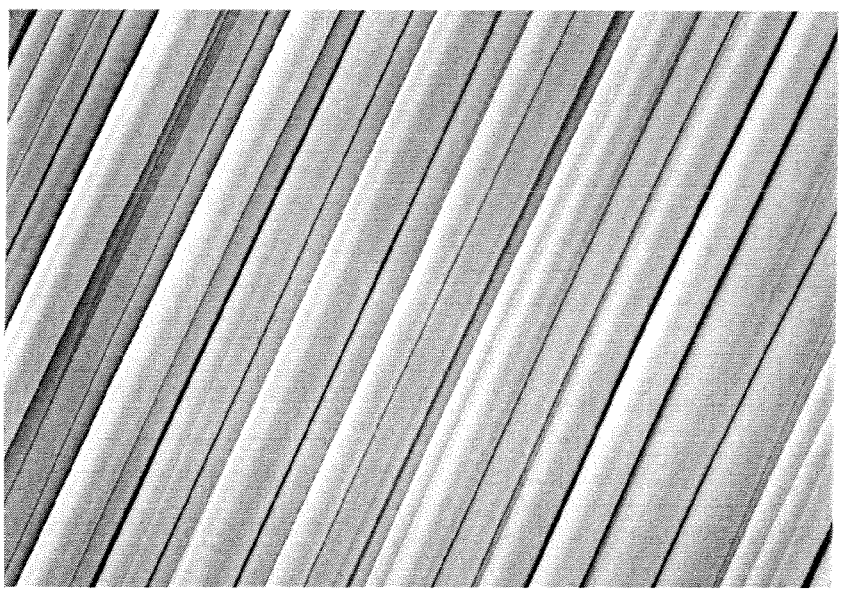
FIG. 8 shows a photomicrograph of a linear distribution kinoform diffuser constructed in accordance with the invention to exhibit a uniform beam distribution.

A complex surface relief pattern of "pebbles" (as shown in FIG. 7) significantly contributes to the production of circular (isotropic) kinoform diffusers with uniform beam distributions, as shown in FIG. 6A. Similarly, a complex surface relief pattern of "corrugations" (as shown in FIG. 8) significantly contributes to the production of elliptical and linear (anisotropic) kinoform diffusers with uniform beam distributions, as shown in FIG. 6B.

A complex surface relief pattern of "pits" (resembling an impression of the pebbled surface shown in FIG. 7) also significantly contribute to the production of circular (isotropic) kinoform diffusers with uniform beam distributions, as shown in FIG. 6A.

Figure 6C:
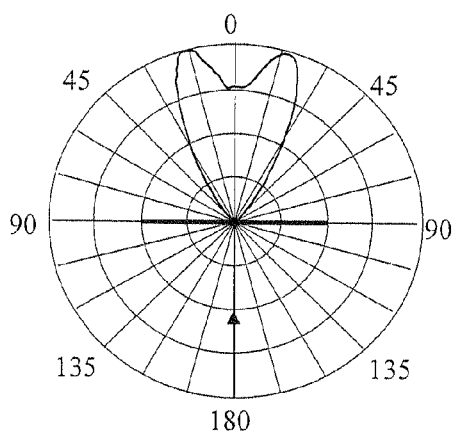
Figure 6D:
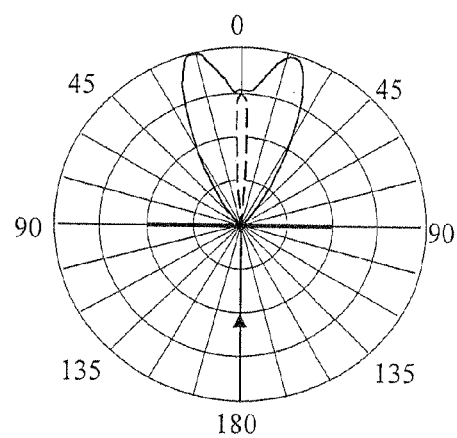
Figure 9:
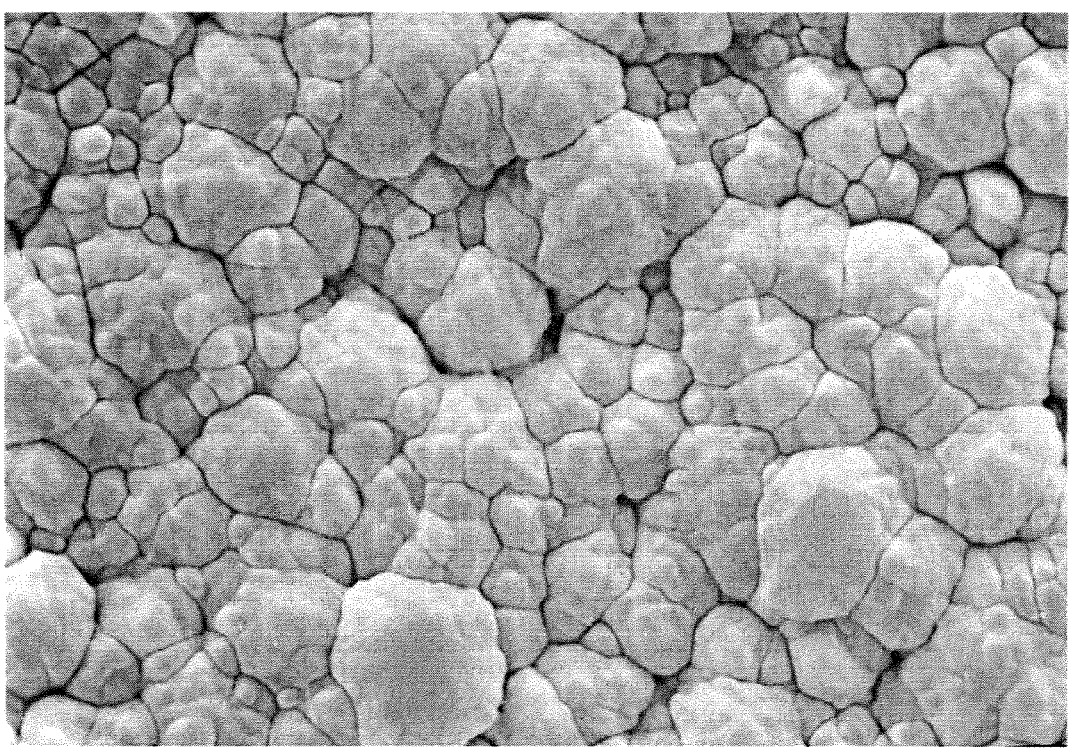
FIG. 9 shows a photomicrograph of a circular distribution kinoform diffuser constructed in accordance with the invention to exhibit an annular beam distribution.

A pattern of substructures or subelements formed on the surfaces of the pebbles (as shown in FIG. 9), pits, or corrugations significantly contributes to the production of kinoform diffusers with annular beam distributions, as shown in FIGS. 6C and 6D. FIGS. 7-9 show that the complex surface relief patterns of light scattering elements in the form of pebbles, pits, or corrugations are characterized by overlapping light scattering elements and interstitial cavities among neighboring ones of the light scattering elements.

The disclosed embodiments are preferably implemented with the use of positive photoresist materials such as Shipley 1818 from Shipley Company (Marlborough, Mass.). These materials typically have nonlinear characteristic responses to the exposing light. The preferred method of fabrication exploits this property by using a combination of controlled parameters for the preparation, exposure, and development of the photoresists and a relatively thick photoresist layer that can be etched to a depth of multiple wavelengths of visible light.

The surface relief features of pits or corrugations are apparently formed by the exposure of the photoresist material to a volumetric cross-section of the three-dimensional laser speckle pattern. The photoresist material is then processed to etch away the exposed portions and produce the three-dimensional scattering elements. Negative photoresist materials such as Microchem SU-8 available from Microchem Corporation (Newton, Mass.) may be used to produce pebbles rather than pits.

The photoresist is applied to a glass substrate using known spin coating techniques. The coating thickness is determined by the photoresist viscosity and the rotation speed, but is generally between 3.0 and 12.0 microns. A single layer of photoresist or multiple layers of photoresists with varying formulations may be usefully applied to the substrate to achieve composite photoresists with desirable non-linear characteristic responses.

The photoresist characteristic response is partly dependent upon the concentration of solvent (typically propylene glycol monomethyl ether acetate) remaining in the material at the time of exposure. It may be necessary to "prebake" the photoresist coating at an elevated temperature to remove the majority of the solvent through evaporation while ensuring that the photoactive component of the resist is not thermally decomposed. The bake time, temperature, humidity, and airflow are carefully controlled during this process to achieve consistent and desirable results.

The photoresist is then exposed to one or a multiplicity of laser speckle patterns. With reference to FIG. 5, the coherent laser beam produced by beam expansion lenses 152 and 154 can be parallel, convergent, or divergent, depending upon the desired kinoform diffuser beam distribution. A non-uniform laser beam intensity profile may also be usefully employed to modify the resultant kinoform diffuser beam distribution. The photoresist may be uniformly exposed prior to exposure to the laser speckle pattern or patterns to pre-sensitize the photoactive component.

The individual laser speckle pattern exposure times are dependent upon the laser power, beam expansion optics, diffuser opacity, and photoresist sensitivity. The laser power may be intentionally reduced to induce reciprocity failure in the photoresist and thereby usefully amplify the nonlinear effects of thin film interference exposure. Regardless, careful exposure control ensures that the maximum exposure is within the dynamic range of the processed photoresist.

Following exposure, the photoresist may optionally be subjected to a "postbake" process at an elevated temperature. This process serves to alleviate the deleterious effects of thin film interference (i.e., standing wave) exposure within the photoresist by diffusing the photoactive component (typically diazonaphthoquinone for positive resists) through the resist matrix (typically a phenolic-formaldehyde resin called "novolac"). It may also be used to thermally catalyze chemical reactions, thereby amplifying the latent image. Again, the bake time, temperature, humidity, and airflow are carefully controlled to achieve consistent and desirable results.

The substructures shown in FIG. 9 appear to be produced as a result of thin film interference exposure within the photoresist. For kinoform diffusers where such corrugations are desirable, postbaking may not therefore not be necessary.

The photoresist is then developed using an alkaline developer such as sodium hydroxide. Commercial developers may contain proprietary additives for specific purposes that modify the photoresist etching process. These additives may usefully modify the photoresist characteristic response.

There are several conventional techniques for applying the developer, including spin coating, spray development, and puddle development. The development time and temperature, together with the developer concentration, are parameters that affect the resultant characteristic response.

Following development, the photoresist may optionally be subjected to a "post-development bake" process at an elevated temperature. This process serves to harden the developed photoresist through crosslinking of the novolac resin and to optionally modify the surface relief profile through softening and plastic flow.

An important attribute of photoresist processing for kinoform diffusers is the resultant contrast γ (gamma), which is expressed as:

$$\gamma = 1/(\log_{10}(E_{max}/E_{min})), \quad (3)$$

where $E_{min}$ is the minimum actinic exposure (measured in millijoules per square centimeter) required to produce a photochemical reaction in the photoactive component leading to etching, and $E_{max}$ is the maximum actinic exposure required to produce etching of the photoresist to the underlying substrate.

The resultant gamma is dependent upon the prebake, exposure, postbake, development, and post-development bake parameters. These parameters are in turn dependent upon the photoresist composition and developer additives. Although skilled persons will realize that it is difficult to characterize the effect of these parameters in combination or predict the results stemming from changing them, the applicants have discovered that the following interrelated parameters affect the resultant gamma: photoresist composition, prebaking, laser beam wavelength, laser power and exposure times, post-baking, developer formulation, developer concentration, development time, development temperature, and post-development baking.

Finding an appropriate combination of process parameters that allows for the production of kinoform diffusers with controllable non-uniform beam distributions is a trial-and-error process. Desirable non-uniform beam distributions can be consistently and reliably produced, and that the beam distribution parameters can be incrementally controlled. In particular, the distributions can be continuously varied between the uniform beam distributions shown in FIGS. 6A and 6B to the non-uniform distributions shown in FIGS. 6C and 6D, respectively.

The zero-order beam can be eliminated by exposing the photoresist to a multiplicity of autocorrelated laser speckle patterns. These patterns may be produced by one or more of the following mechanical movements: shift photoresist plate perpendicular to laser beam direction; shift diffuser perpendicular to laser beam direction; shift photoresist plate parallel to laser beam direction; shift diffuser parallel to laser beam direction; rotate photoresist plate about axis perpendicular to laser beam direction; rotate diffuser about axis perpendicular to laser beam direction; rotate photoresist plate about axis parallel to laser beam direction; and rotate diffuser about axis parallel to laser beam direction. In addition, the laser beam intensity profile incident upon the diffuser can be optically modified to effect a partial decorrelation of the laser speckle pattern.

In a first preferred diffuser embodiment, a kinoform diffuser with the uniform beam distribution shown in FIG. 6A may be produced by first spin coating a glass plate with Shipley 1818 or 1827 positive photoresist. This plate is then optionally prebaked at 85 degrees C. for thirty minutes in an oven to remove excess solvent.

The baked plate is cooled to room temperature and exposed to a laser speckle pattern generated using the optical setup shown in FIG. 5, using opaque mask 156 with a circular aperture 158. A 180-milliwatt helium-cadmium laser is used to illuminate the ground glass diffuser 160.

The exposed plate is then shifted in a random direction perpendicular to the illuminating beam axis before exposing the plate to the same laser speckle pattern. This process is repeated several times to eliminate zero-order beam transmission.

Following exposure, the plate may optionally be post-baked at 110 degrees C. for five minutes in an oven to eliminate possible defects resulting from thin film interference and thermally catalyze chemical reactions that may amplify the latent image.

The exposed plate is developed in Shipley 303A developer diluted with water and is then placed in a water rinse bath to stop the etching process, dried, and optionally post-baked at 110 degrees C. for 60 seconds.

By changing the development time, a kinoform diffuser with the non-uniform beam distribution shown in FIG. 6C may be produced. Varying the development time produces a continuous and controllable variation in the beam distribution.

By substituting an elliptical or rectangular aperture 158 in opaque mask 156, kinoform diffusers with elliptical or linear beam distributions may be produced as shown in FIG. 6B and FIG. 6D, respectively.

In a second preferred diffuser embodiment, a digitized representation of the three-dimensional surface relief pattern comprising the kinoform diffuser is computer-generated from mathematical models or obtained from a scanning confocal microscope. This representation is then fabricated in a photopolymerizable resin using known stereolithography techniques as described in Maruo, S. et al., "Three-Dimensional Microfabrication with Two-Photon-Absorbed Photopolymerization," *Optics Letters* 22(2):132-134 (Jan. 15, 1997), Cumpston, B. J., et al., "Two-Photon Polymerization Initiators for Three-Dimensional Optical Data Storage and Microfabrication," *Nature* 398(4):51-54 (Mar. 4, 1999), and Galajda, P., and P. Ormos, "Complex Micromachines Produced and Driven by Light," *Applied Physics Letters* 78(2): 249-251 (Jan. 8, 2001). As described, for example, in the publication of Galajda and Ormos, a layer of Norland NOA 63 optical adhesive from Norland Products (Cranbury, N.J.) is applied to a substrate. The 514 nm line output of a 20 milliwatt argon laser is then focused to a 0.5 µm diameter spot within said layer to initiate two-photon polymerization. Moving the substrate along a preprogrammed trajectory with a P3D 20-100 three-axis piezo translation stage from Linos Photonics (Milford, Mass.) allows arbitrary three-dimensional microstructures to be fabricated. The unexposed resin is then removed by dissolving in acetone.

Skilled persons will appreciate that the surface relief pattern responsible for the optical characteristics of a transmissive kinoform diffuser is the boundary between two transparent media with different indices of refraction. This encompasses, therefore, an embodiment in which a protective layer of a transparent medium with a different refractive index is applied to the surface of a kinoform diffuser. As an example, a transmissive kinoform diffuser made from a polymerized optically transparent resin with a refractive index of 1.56 could be coated with fluoropolymer such as Teflon AF from E.I. du Pont de Nemours and Company with a refractive index of 1.30.

Kinoform diffusers as described above are microscopic surface relief patterns applied to one or both surfaces of substantially transparent optical elements such as glass or plastic substrates. Various manufacturing methods may be employed, including but not limited to: a) casting and curing of ultraviolet-polymerizable resin films onto glass or plastic substrates; b) embossing plastic substrates or films; c) vacuum-forming plastic substrates; d) lamination of plastic films with kinoform diffusers onto glass or plastic substrates; e) bulk casting or injection molding of glass or plastic substrates; and f) casting or embossing of sol gel materials onto glass or plastic substrates. These optical elements are then used in the manufacture of luminaires in accordance with the design principles disclosed herein.

The lower hemisphere optical effect entails receiving incident light leaving source 22 at high angles into lower hemisphere 100 and redirecting the light to work plane 104. This light combined with the lambertian distribution of light propagating from perforated center basket 50 creates a batwing distribution in lower hemisphere 100, as shown in FIG. 4A. The upper hemisphere optical effect entails the high transmittance of side diffuser panels 78 and 80 and the limitation of reflection toward ceiling surface 44. If it were to occur, such reflection would fill in light directly above luminaire 10 and, therefore, would negatively impact the widespread batwing distribution there.

Side reflectors 88 and 92 are made of steel coated with high reflectance white paint. Side reflectors 88 and 92 are inwardly inclined in opposition to each other to illuminate side diffuser panels 78 and 80 from the opposite direction of the light emitted by lamp 22 so that the diffuser panel on the opposite side of an observer appears luminous.

Upper side diffusers 24 and 26, which are made of extruded prismatic acrylic material with opal additive, are sufficiently diffuse to scatter light back onto ceiling surface 44 above ballast channel 14. The amount of opal additive is chosen to achieve the desired balance of transmission, scattering, and reflection of incident light. Upper side diffusers 24 and 26 each have a light diffusing surface with a textured portion 220 that decreases in thickness toward their respective distal ends 36 and 40. This design configuration makes each upper side diffuser more diffusive of light incident nearer to ballast channel 14 and transmissive at its distal end. The transmissive property at the distal ends eliminates striation to provide progressive light intensity and, therefore, more uniform ceiling illumination. The lower hemisphere optical effect entails reflection of a small amount of light down toward the lower optics. The upper hemisphere effect entails the steering of a small amount of light around ballast channel 14 to illuminate the area above it and the easing of transition when the lamp image begins to project toward ceiling surface 44.

Upper reflector 20 is made of steel coated with high reflectance white paint. The lower hemispherical optical effect entails reflection of light down to side diffuser panels 78 and 80 to enhance batwing light intensity distribution and increase the proportion of downlight. The upper hemispherical effect entails in combination with ballast channel 14, blocking from upper hemisphere 102 direct light that would otherwise over-illuminate ceiling surface 44 directly above luminaire 10 and thereby create a hot spot.

It will be obvious to those having skill in the art that many changes may be made to the details of the above-described embodiments without departing from the underlying principles of the invention. For example, light source 22 can be implemented with multiple lamps. Moreover, although a kinoform diffuser is preferred for each of side diffuser panels 78 and 80, a batwing luminous intensity pattern can be achieved with side diffuser panels 78 and 80 made of other diffuser material that results in diffused light at a range of exit angles that is narrower than a range of angles of incident light. The scope of the present invention should, therefore, be determined only by the following claims.

The invention claimed is:

1. A light control device implemented with multiple diffusers exhibiting, in response to incident light, multiple controllable intensity distribution patterns that cooperate to accomplish upwardly directed illumination of a ceiling surface and downwardly directed illumination of a work surface, comprising:

an elongated housing having a central channel and first and second upper uplight openings on either side of said central channel;

said elongated housing further having a first and second side walls, said housing positioning said channel substantially between said first and second side walls;

a light source emitting first and second sets of light rays and extending substantially between said first and second upper uplight openings and below said central channel;

a first diffuser retained between said first and second side walls and below said light source, said first diffuser being both partially transmissive and partially reflective and positioned to receive direct light emitted by the light source and carried by a first subset of the first set of light rays, the first diffuser having a light diffusing surface that partly transmits and partly scatters the first subset of the first set of light rays that, respectively, propagate as a divergent fan of light rays downwardly toward the work surface and propagate as two divergent fans of light rays upwardly and uninterrupted toward the ceiling surface; and a second diffuser being a first and second upper side diffuser substantially above said light source and extending substantially along respective said first and second upper uplight openings, each of said first and second upper side diffusers more diffusive of light incident nearer to said central channel and transmissive at a distal end;

said second diffuser being positioned to receive direct light emitted by the light source and carried by the second set of light rays, the second diffuser having a light diffusing surface that scatters the second set of light rays that propagate as two partly overlapping fans of light rays upwardly toward the ceiling surface, whereby the two divergent fans of light rays propagating from the first diffuser, the two partly overlapping fans of light rays propagating from the second diffuser, and direct light propagating from the light source combine and exit the light control device through said first and second uplight openings on either side of said central channel in a batwing luminous intensity distribution pattern toward the ceiling surface.

2. The light control device of claim 1, further comprising a lambertian light transmitting diffuser positioned to receive the partly transmitted light rays propagating from the first diffuser and being of a character that diffuses the partly transmitted light rays to form diffused light that exits the light control device in a lambertian luminous intensity distribution pattern toward the work surface.

3. The light control device of claim 2, in which the lambertian light transmitting diffuser comprises a perforated basket.

4. The light control device of claim 2, further comprising first and second downlight diffusers positioned adjacent the lambertian light transmitting diffuser and to receive a second subset of the first set of light rays to form diffused light exhibiting a distribution pattern of luminous intensity, the first and second downlight diffusers and the lambertian light transmitting diffuser having optical properties cooperating such that the diffused light propagating from the first and second downlight diffusers and the diffused light propagating from the lambertian light transmitting diffuser exit the light control device in a batwing luminous intensity distribution pattern toward the work surface.

5. The light control device of claim 4, in which each of the first and second downlight diffusers includes a film material that has a surface relief light diffusing structure.

6. The light control device of claim 5, in which the first and second downlight diffusers are of a kinoform type.

7. The light control device of claim 4, in which the first and second downlight diffusers each have proximal and distal sides, and further comprising first and second side reflectors, the proximal sides of the first and second downlight diffusers positioned adjacent the lambertian light transmitting diffuser and the distal sides of the first and second downlight diffusers positioned adjacent the respective first and second side reflectors.

8. The light control device of claim 1, in which the second diffuser includes said first and second upper side diffusers separated by a light reflector.

9. The light control device of claim 1, further comprising an elongated housing that supports the first and second diffusers, and in which the light source is of tubular shape, positioned within the housing, and cooperates with the first and second diffusers to form a luminaire.

10. The light control device of claim 9, in which the tubular light source includes a fluorescent lamp.

11. The light control device of claim 1, in which the light source includes multiple lamps.

12. A light control device for generating uplight and downlight in controllable intensity distribution patterns, comprising:
a housing retaining a longitudinally extending light source, said housing having an upper surface, said upper surface having a first and second uplight apertures;
said first and said second uplight apertures separated by a longitudinally extending structure substantially along and above said light source;
said light source mounted to said housing in substantially central alignment within said housing;
a first and a second uplight side diffuser extending substantially along respective said first and said second uplight apertures and mounted adjacent said longitudinally extending structure;
a first and a second downlight diffusers positioned below said light source and having a lower center diffuser, said lower center diffuser positioned to receive direct light emitted by said light source, said lower center diffuser having a light diffusing surface that scatters said direct light as two partly overlapping fans of light rays upwardly toward the ceiling surface through said first and said second uplight apertures;
said lower center diffuser being both partially transmissive and partially reflective and combined with a perforated diffuser which transmits a lambertian luminous intensity distribution pattern downward away from said light source;
said first and said second downlight diffusers and said perforated diffuser having optical properties cooperating such that the diffused light propagating from said first and second downlight diffusers and said diffused light propagating from said perforated diffuser exit said light control device in a batwing luminous intensity distribution pattern downward away from said light source;
wherein said first and said second downlight diffusers include a film material having a surface relief light diffusing structure.

13. The light control device of claim 12 wherein film material surface relief light diffusing structure is a complex surface relief pattern that produces controllable diffusion characteristics with off-axis transmittance and reflectance properties, elimination of zero-order beam, and freedom from spectral dispersion under achromatic illumination.

14. The light control device of claim 12 wherein said first and said second uplight side diffusers are more diffusive of light incident nearer to said central channel and transmissive at a distal end.

15. The light control device of claim 14 said first and second uplight side diffusers each have a light diffusing surface with a textured portion that decreases in thickness toward their respective distal ends.

16. A light control device for generating uplight and downlight in controllable intensity distribution patterns, comprising:
a housing retaining a longitudinally extending light source, said housing having an upper surface, said upper surface having a first and second uplight apertures;
said light source mounted to said housing in a substantially central alignment;
a first and a second uplight side diffuser extending substantially along respective said first and said second uplight apertures;
a first and a second downlight diffusers positioned below said light source in combination with a lower center diffuser, said lower center diffuser positioned to receive direct light emitted by said light source, said lower center diffuser having a light diffusing surface that scatters said direct light as two partly overlapping fans of light rays upwardly toward the ceiling surface through said first and said second uplight apertures;
said lower center diffuser being both partially transmissive and partially reflective;
said first and said second downlight diffusers having optical properties such that the diffused light propagating from said first and second downlight diffusers and said lower center diffuser exit said light control device in a batwing luminous intensity distribution pattern downward away from said light source;
wherein said first and said second downlight diffusers include a film material having a surface relief light diffusing structure that produces controllable diffusion characteristics with off-axis transmittance and reflectance properties, elimination of zero-order beam, and freedom from spectral dispersion under achromatic illumination.

* * * * *